(12) United States Patent
Salsi

(10) Patent No.: US 10,538,208 B2
(45) Date of Patent: Jan. 21, 2020

(54) REAR CYCLE CARRIER

(71) Applicant: F.LLI MENABO' S.R.L., Cavriago (Reggio Emilla) (IT)

(72) Inventor: Andrea Salsi, Bagnolo in Piano (IT)

(73) Assignee: F.LLI MENABO' S.R.L., Cavriago (IT)

(*) Notice: Subject to any disclaimer, the term of this patent is extended or adjusted under 35 U.S.C. 154(b) by 0 days.

(21) Appl. No.: 16/050,561

(22) Filed: Jul. 31, 2018

(65) Prior Publication Data
US 2019/0061637 A1 Feb. 28, 2019

(30) Foreign Application Priority Data
Aug. 25, 2017 (IT) .......................... 102017000096244

(51) Int. Cl.
B60R 9/10 (2006.01)
B60R 9/06 (2006.01)
B62D 35/00 (2006.01)

(52) U.S. Cl.
CPC ............... *B60R 9/10* (2013.01); *B60R 9/06* (2013.01); *B62D 35/007* (2013.01)

(58) Field of Classification Search
CPC ............................. B60R 9/10; Y10S 224/924
USPC ........................................................ 224/924
See application file for complete search history.

(56) References Cited

U.S. PATENT DOCUMENTS

| 3,710,999 A | 1/1973 | Allen | |
| 4,875,608 A * | 10/1989 | Graber | B60R 9/06 224/493 |
| 5,593,076 A * | 1/1997 | Biondo | B60R 9/06 224/485 |
| 6,460,887 B2 | 10/2002 | Tremblay | |
| 2001/0008331 A1 | 7/2001 | Tremblay | |
| 2002/0185506 A1 | 12/2002 | Kmita et al. | |
| 2005/0082324 A1 * | 4/2005 | Schlachter | B60R 9/048 224/319 |
| 2017/0259750 A1 | 9/2017 | Lucas | |

FOREIGN PATENT DOCUMENTS

| DE | 202017100997 U1 | 5/2017 |
| JP | 3145441 U * | 10/2008 |
| TW | 369884 U * | 12/2009 |

* cited by examiner

*Primary Examiner* — Scott T McNurlen
(74) *Attorney, Agent, or Firm* — Pearne & Gordon LLP

(57) ABSTRACT

A cycle carrier designed to be mounted on a rear part of a vehicle provided with an upper spoiler; the cycle carrier includes a loading frame for removably loading at least one bicycle, a fixing device for removably fixing a lower portion of the loading frame to a lower region of the rear part, at least one anchoring assembly for removably fixing an upper portion of the loading frame to a region of an upper edge of the rear part. The anchoring assembly includes a plate which is positioned, when the cycle carrier is installed, for resting on the spoiler and engaging in the region of the upper edge. The fixing device includes an adapter which is rigid and is fixable to the vehicle using existing holes in the lower region of the rear part.

12 Claims, 6 Drawing Sheets

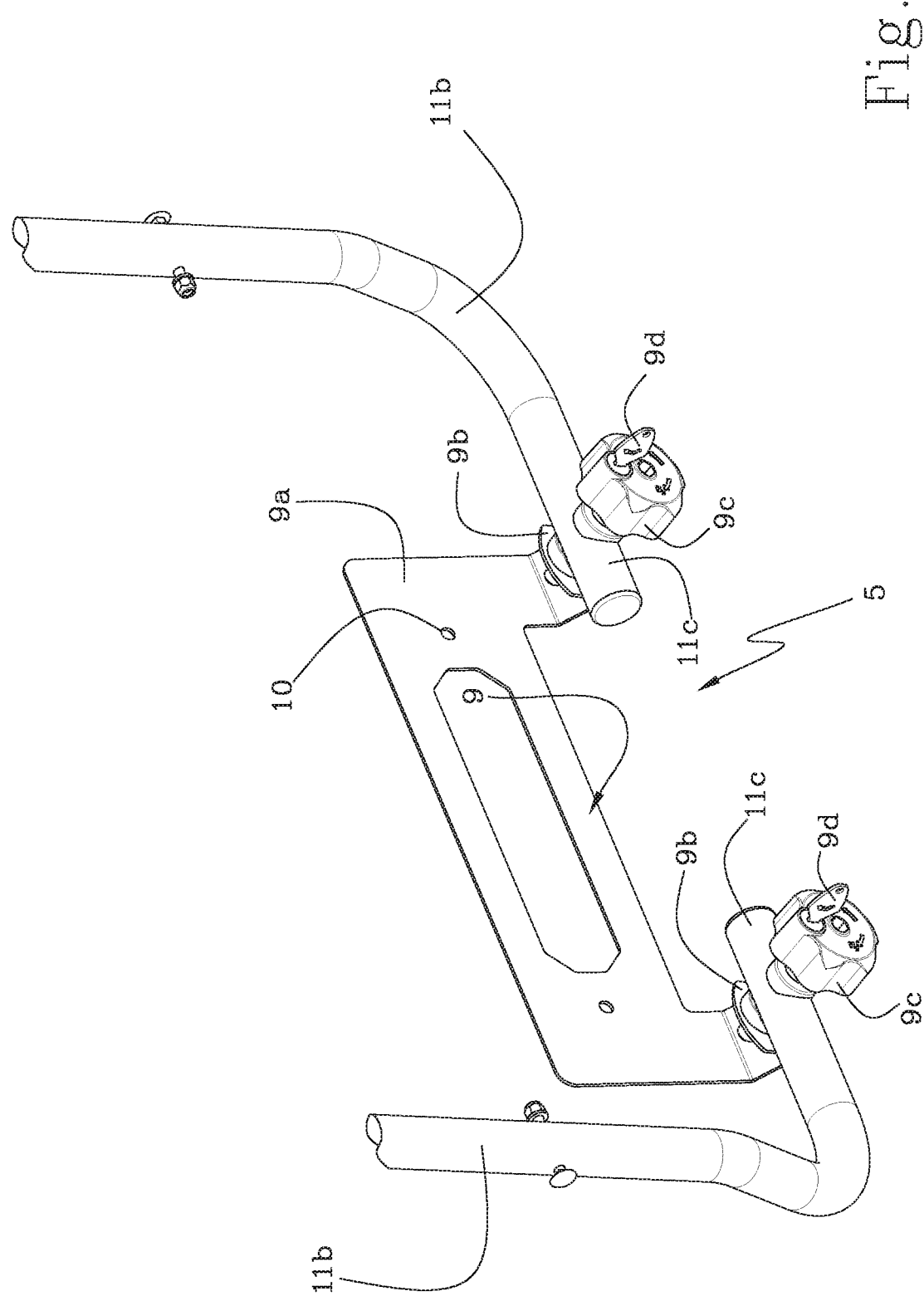

REAR CYCLE CARRIER

This invention relates to a rear cycle carrier, that is to say, an apparatus for transporting a bicycle on a rear part of a vehicle, when the rear part is equipped with a spoiler.

More in detail, the invention relates to a rear cycle carrier designed to be mounted on a rear part of a vehicle and which comprises a loading frame for removably loading at least one bicycle, a fixing device for removably fixing a lower portion of the loading frame to a lower region of the rear part and at least one anchoring assembly for removably fixing an upper portion of the loading frame to a region of an upper edge of the rear part.

In family cars or multipurpose vehicles, the rear part which allows access to a boot and to the inside of the vehicle is a door commonly called "hatchback" and it will be referred to as such below. The hatchback is absent if the vehicle is a saloon car, that is to say, a vehicle with a closed passenger compartment.

A spoiler is a protruding aileron which increases the stability of the vehicle, modifying the aerodynamic set-up, and which, if it is mounted on the rear part of a vehicle with a hatchback, is typically applied in an upper region of the hatchback.

Numerous types of rear cycle carriers are known on the market which comprise a frame for loading bicycles which can be hooked to a vehicle by means of an anchoring assembly comprising hooks anchored to the hatchback and tensioning straps or belts between the hooks and the loading frame.

Typically, there are two upper anchoring hooks fixable to the upper edge of the hatchback, in a slot made between a roof of the vehicle and the hatchback, and two lower anchoring hooks fixable to a lower edge of the hatchback, in a further slot between the hatchback and the rear bumpers. There may be two further lateral anchoring hooks, to improve the stability of the cycle carrier, which can be fixed to respective slots present laterally between the rear hatchback and the side panels of the vehicle.

In order to fix the rear cycle carrier to the vehicle, a user initially positions the anchoring hooks in the suitable positions and then tightens the straps until stably blocking the loading frame to the vehicle. Typically, the straps fixed to the anchoring hook are tensioned towards the lower part of the vehicle since the loading frame is positioned, when installed, in such a way that the bicycles, when mounted, protrude as little as possible outside the shape of the vehicle.

If the vehicles are equipped with hatchbacks with a rear spoiler, the straps, resting on the spoiler during tensioning towards the lower part of the vehicle, could damage shiny parts of the spoiler.

A rear cycle carrier has therefore been proposed on the market which is designed for being also used on vehicles equipped with hatchback with spoiler, which comprises a loading frame with arms directed upwards and protruding above the shape of the vehicle and an anchoring hook which is connected to straps tensioned upwards, so that the straps do not rest on the spoiler. Bicycles, once fixed on the loading frame, also protrude above the shape of the vehicle.

These rear cycle carriers, for vehicles equipped with hatchbacks with rear spoilers, have a complex structure due to the presence of the arms of the loading frame directed upwards. Moreover, the presence of bicycles protruding above the shape of the vehicle makes the stability of the loading frame critical in the association between the frame and the vehicle, which is determined by a correct adjustment of a final locking tension of the straps with which the cycle carrier is fixed to the hatchback, which is typically entrusted to the experience of each user.

The technical purpose which forms the basis of the invention is therefore to provide a rear cycle carrier which is designed to be mounted on a hatchback even in the presence of a spoiler positioned in an upper region of the hatchback.

In the context of this technical purpose, an aim of the invention is to provide a rear cycle carrier which is easy to install on the vehicle, reducing to a minimum the number of successive steps necessary for the installation and which at the same time guarantees a stable association of the loading frame to the vehicle regardless of the installation experience of each user.

A further aim is to provide a rear cycle carrier which has a simple and inexpensive structure.

This aim is achieved by the rear cycle carrier made according to claim 1.

Further features and advantages of this invention are more apparent in the detailed description below, with reference to a preferred, non-restricting, embodiment of a cycle carrier as illustrated in the accompanying drawings, in which:

FIG. 1 is an axonometric view of a cycle carrier according to the invention, mounted on a hatchback of a vehicle and to which are attachable three bicycles, wherein the hatchback is equipped with a spoiler and the cycle carrier comprises a fixing device, for removably fixing a lower portion of the loading frame to a lower region of the hatchback; an anchoring assembly, for removably fixing an upper portion of the loading frame to a region of an upper edge of the hatchback;

FIG. 7 is an axonometric view of the cycle carrier of FIG. 1, wherein some parts are removed for clarity, showing a fixing device of FIG. 1.

Figure 1:
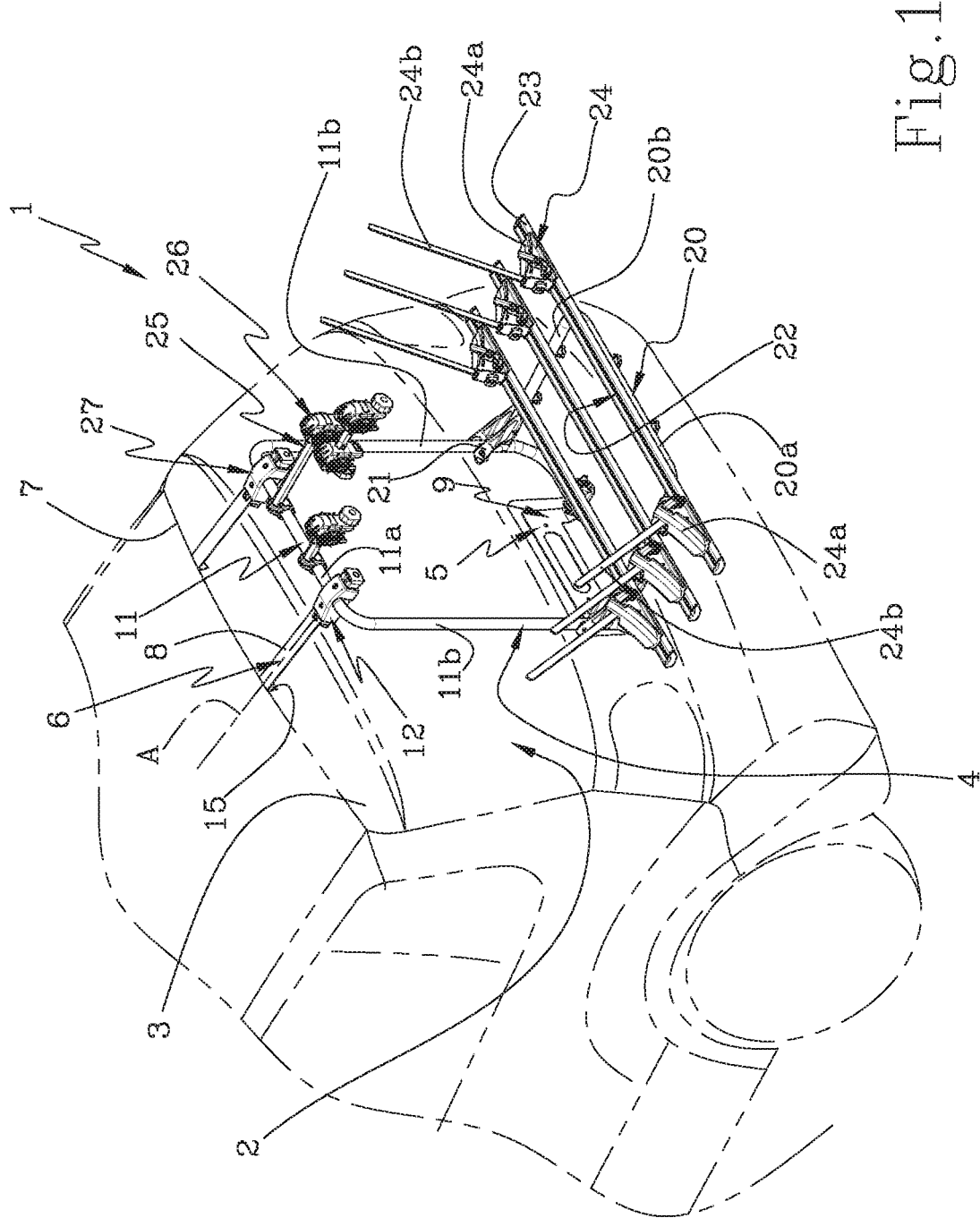

With reference to the above-mentioned FIGS. 1 to 7, the numeral 1 denotes a rear cycle carrier according to the invention.

The proposed cycle carrier 1 is designed to be mounted on a rear part 2 of a vehicle, wherein the rear part 2 is equipped with a rear spoiler 3.

As mentioned above, the term "hatchback" is used to mean the rear part of a family car or a multipurpose vehicle which allows access to a boot and to a passenger compartment of the vehicle. The rear part of the vehicle will be referred to below as the hatchback.

The term spoiler indicates, on the other hand, a protruding aileron applied to a zone of the bodywork for improving the aerodynamic and driving performance of the vehicle.

The proposed cycle carrier 1 is designed to be mounted on a hatchback 2 which is fitted with a spoiler 3 located in an upper region of the hatchback 2.

It should be noted that in this description the relative terms mentioned below, that is, front and/or rear, upper and/or lower, top and/or bottom refer to a cycle carrier when the cycle carrier is mounted on a vehicle.

The spoiler 3 must be load-bearing, that is to say, it must be able to support itself, when fixed to, and/or integrated with, the hatchback itself and it must also be able to support a predetermined weight load. The spoiler 3 may, for example, be made in a single piece with the hatchback 2.

The cycle carrier 1 comprises a loading frame 4 for removably loading at least one bicycle (not illustrated) and comprises a fixing device 5 for removably fixing a lower portion of the loading frame 4 to a lower region of the hatchback 2.

The cycle carrier 1 also comprises an anchoring assembly 6 for removably fixing an upper portion of the loading frame 4 to a region of an upper edge 7 of the hatchback 2.

The upper edge 7 is an end edge of the hatchback 2, located at a gap (not illustrated) between a roof of the vehicle and the hatchback 2.

The anchoring assembly 6 comprises a plate 8, which is flat and elongated, which extends along a respective longitudinal axis of extension A, which is positioned for resting on the spoiler 3 and engaging in the region of the upper edge 7.

In other words, the plate 8 and rests on an upper surface of the spoiler 3 by which it is supported. For this reason, a coating made of impact-resistant material (not illustrated) is positioned on a lower face of the plate 8, configured for the resting with the spoiler 3, to prevent damaging an upper surface of the spoiler 3.

The fixing device 5 (shown in detail in FIG. 7) comprises an adapter 9 which is rigid and is fixable to the vehicle using holes (not illustrated) already set up in the lower region of the hatchback 2.

In detail, the holes are provided on the vehicle for fixing a rear registration plate 30 (FIG. 2) and the adapter 9 comprises a plate 9a, which is below the registration plate, substantially rectangular in shape, designed to be positioned under the registration plate 30 and to be fixed to the vehicle using the same existing holes for fixing the registration plate 30. Typically, these holes are positioned in the lower region of the hatchback 2, close to a rear bumpers.

In effect, it should be noted that the plate 9a below the registration plate is equipped with respective holes 10 which, when the adapter 9 is installed, are aligned with the holes already provided in the hatchback 2.

This allows the superposing of the registration plate 30 on the adapter 9 and, therefore, the simultaneous fixing of the registration plate 30 and the adapter 9 by means of fixing screws 30a.

It should be noted that advantageously, according to invention, by using the rigid anchoring assembly 6 and the fixing device 5 with the adapter 9, which is also rigid, it is possible to make a rear cycle carrier 1 without straps.

The loading frame 4 comprises a support section 11 which is shaped and includes a support portion 11a.

The shaped support section 11 may advantageously be made with a tubular metal profile, for example made of aluminium or steel.

The anchoring assembly 6 also comprises a support device 12 fixed to a first end of the plate 8, which is configured to receive a part of the support portion 11a.

The support section 11 is, in effect, preferably U-shaped and the support portion 11a has ends which extend in two lateral support arms 11b, which are also tubular, which, once the cycle carrier 1 is installed, face downwards. Preferably, for simplicity of construction, the support portion 11a is linear but, according to a variant embodiment not illustrated, it is sufficient that only the part of the support portion 11a designed to be received in the support device 12 is linear, the remaining part of the support portion 11a being able to have a different shape.

The fixing device 5 is removably fastened to the loading frame 4 since the lateral support arms 11b have respective ends 11c removably fixed to the adapter 9.

In effect, the adapter 9 is provided with two portions bent upwards, which, with the adapter 9 installed, extend from opposite portions of ends of a lower edge of the plate 9a below the registration plate, and are U-shaped to form two lateral protrusions 9b. These lateral protrusions 9b are removably fastened to the lower ends 11c of the lateral support arms 11b by means of respective anti-theft knobs 9c equipped with respective keys 9d. Each knob 9c is adapted to clamp the end 11c of the lateral support arm 11b against the respective lateral projection 9b.

Figure 4:
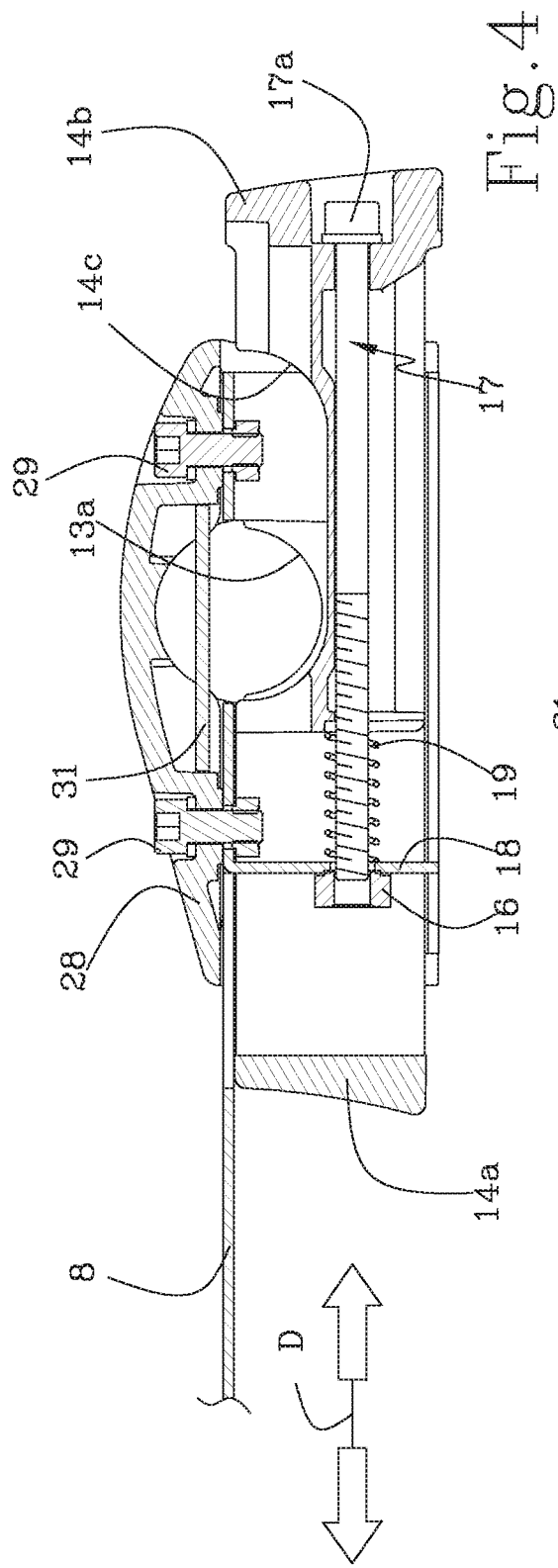
FIG. 4 is a cross-section view along a plane passing through a longitudinal axis of extension of the anchoring assembly of FIG. 3, wherein a case of the anchoring assembly is in a retracted position.

As shown in FIGS. 3 to 6, the support device 12 comprises a respective elongated body 13 which extends along the axis A and is made, preferably, in a single piece with the plate 8. The support device 12 also comprises a case 14, which is inside the body 13 and is slidable in an advancement direction D parallel to the axis A between an advanced operating position (FIG. 5) and a retracted position (FIG. 4). When the case 14 is in the advanced operating position, the case 14 is positioned, when the cycle carrier 1 is installed, under the plate 8 in such a way that a lower surface of the case 14 slides on a lower face of the plate 8.

The case 14 is equipped with a first end 14a provided with a presser element made of impact-resistant material designed to make contact with the vehicle, with the cycle carrier installed, when the case 14 is at least in the advanced operating position.

The plate 8 comprises a second end 15 which is curved to engage in the region of the upper edge 7. More in detail, the second end 15 is designed to couple to the above-mentioned region 7.

According to an important aspect of the invention, the dimension along the axis of extension A of the plate 8, in particular between the support device 12 and the second end 15, is greater than the dimension of the spoiler 3 along the axis A, in such a way that the plate 8 rests on the entire spoiler 3 and protrudes from it.

In this way, the presser element 14a of the case 14 may make contact and press, in the advanced operating position, a zone of the hatchback 2 positioned substantially below the plate 8 and transversal to it.

Since the plate 8 rests on the spoiler 3, as stated above, it is necessary that the spoiler 3 is load-bearing since it must be able to support the weight of the cycle carrier 1 and any bicycles loaded on it.

There are vehicles on the market with hatchbacks 2 and spoilers 3 which are each very different to each other.

If the spoiler 3 has a significant thickness and is, in other words, equipped with an upper surface on which the plate 8 may be supported and a rear surface, substantially perpendicular to the upper or transversal surface, the presser element 14a can make contact and press the rear surface. If, on the other hand, according to a variant embodiment not illustrated, the spoiler 3 is thin and it is an aileron substantially without the rear surface, the presser element 14a can make contact and press a zone of the hatchback 2 beneath the spoiler 3, for example a transparent rear window. The plate 8 and the presser element 14a of the case 14 of the anchoring assembly 6 are therefore parts with sizes which must be suitably designed for the type of vehicle on which the rear cycle carrier 1 is to be installed.

The size of the plate 8 depends in effect on the length of the spoiler 3 of the vehicle. Similarly, the shape of the presser element 14a depends on the shape and/or the inclination of the surface against which the presser element 14a, with the cycle carrier installed, is brought into contact. In other words, the shape of the first end 14a depends on the shape of the rear hatchback 2 and/or of the spoiler 3.

The drawings show, by way of example, a presser element 14a having a to front surface substantially perpendicular to the axis of extension A.

In order for the case 14 to slide in the direction D between the advanced operating position and the retracted position, the support device 12 comprises a respective first movement element 16, fixed to the body 13 and a respective second movement element 17 which is elongated, housed in the case 14 and it is provided with a head end 17a.

The first element 16, for example a threaded nut, and the second movement element 17, for example a screw with a thread complementing that of the nut, are coupled to each other by threaded coupling in such a way that, by rotating the second element 17 by means of the head end 17a, the case 14 can slide in the body 13.

In other words, according to an important aspect of the invention, a user can slide the case 14 towards the hatchback 2 by screwing the screw 17 by means of the head end 17a and can retract the case 14 in the opposite direction, away from the hatchback 2, towards the retracted position by unscrewing the screw 17.

The first movement element 16 is fixed to a wall 18 of the support device 12 positioned perpendicularly to the axis A of longitudinal extension. The head end 17a of the second movement element 17 is, on the other hand, housed in, and supported by, a second end 14b of the case 14 for being actuated by the user.

The second movement element 17 is therefore supported by the first movement element 16, on which it slides, and by the second end 14b.

In order to favour the moving away of the case 14 from the hatchback 2 and, therefore, the retraction of the case 14 in the retracted position, the support device 12 comprises an elastic element 19, for example a spring, surrounding the second movement element 17, a first end of which is fixed to the transversal wall 18 and a second end of which is fixed in an intermediate position of the second movement element 17.

The elastic element 19 is at rest when the case 14 is in the retracted position and is compressed when the case 14 is in the advanced operating position in such a way to favour the movement of the case towards the retracted position, which is at rest for the elastic element 19.

Figure 5:
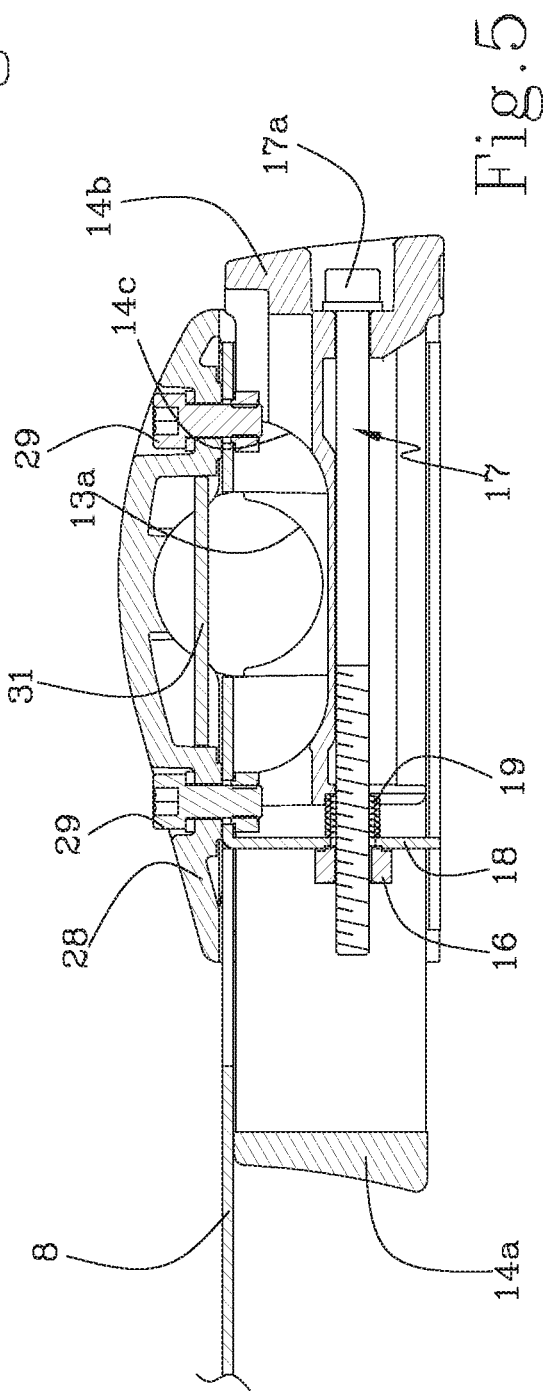
FIG. 5 is a cross section view as in FIG. 4, wherein the case is in an advanced position.
Figure 6:
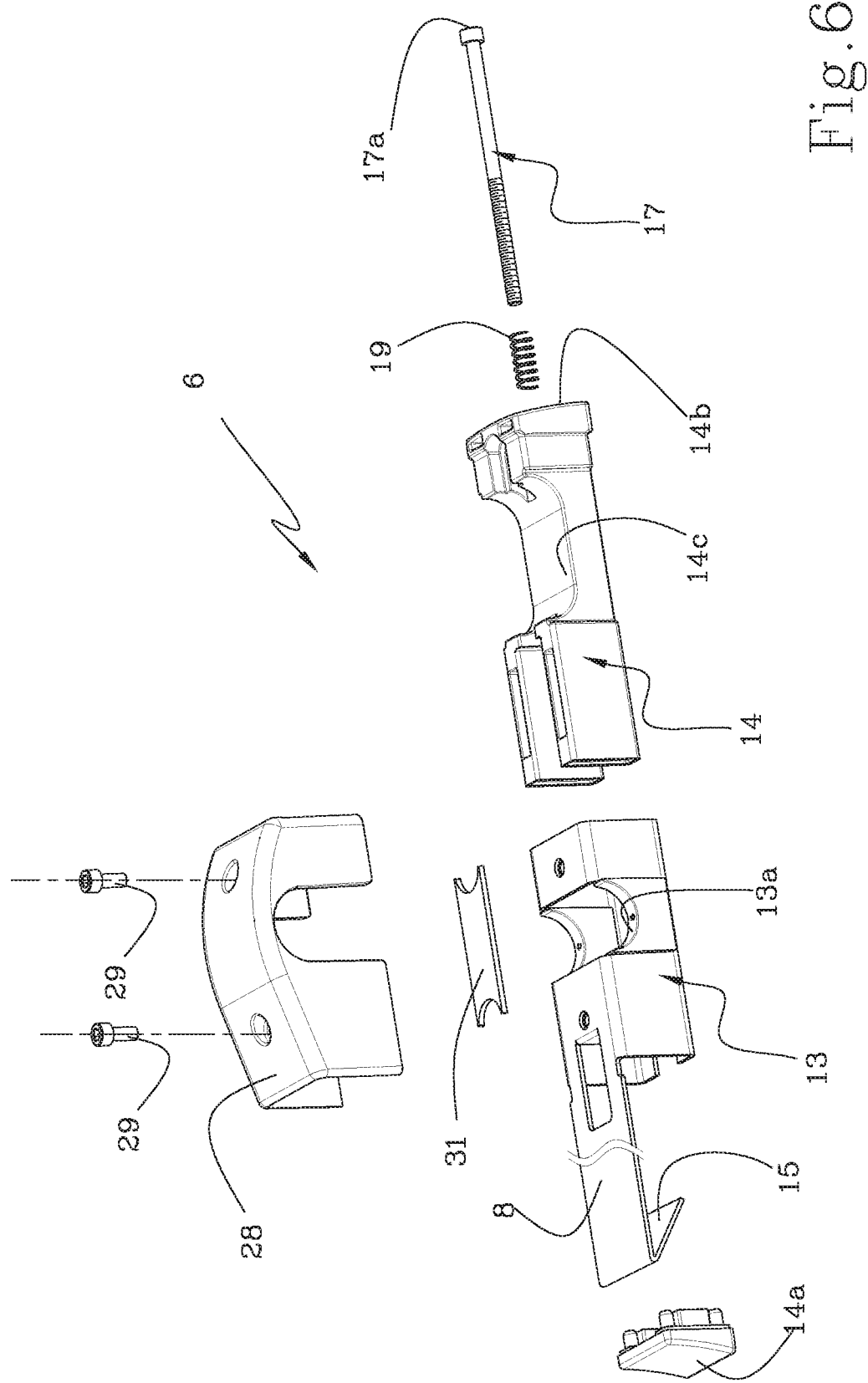
FIG. 6 is an exploded axonometric view of the anchoring assembly of FIG. 3.

As illustrated in FIGS. 4, 5 and 6, it should be noted that the body 13 and the case 14 comprise respective seats 13a, 14c which are designed to receive the part of the support portion 11a.

The seat 13a of the body 13 is shaped like a cradle with a circular cross section for receiving the tubular support portion 11a. The seat 14c of the case 14 is shaped like a slot and has dimensions greater than the seat 13a of the body 13 for housing the part of the support portion 11a during the entire movement of the case 14 between the advanced operating position and the retracted position.

The support device 12 also comprises a lid 28 for closing the body 13 by means of respective fixing screws 29 and a presser plate 31 housed inside the body 13 for pressing the part of the support portion 11a when the part is received in the seat 13a in such a way as to stably associate the part to the support device 12.

The loading frame 4 also comprises a loading section 20, also shaped and comprising a loading section 20a, which is equipped with ends which extend into two lateral loading arms 20b.

The loading section 20 is also U-shaped and the loading portion 20a is linear.

Figure 2:
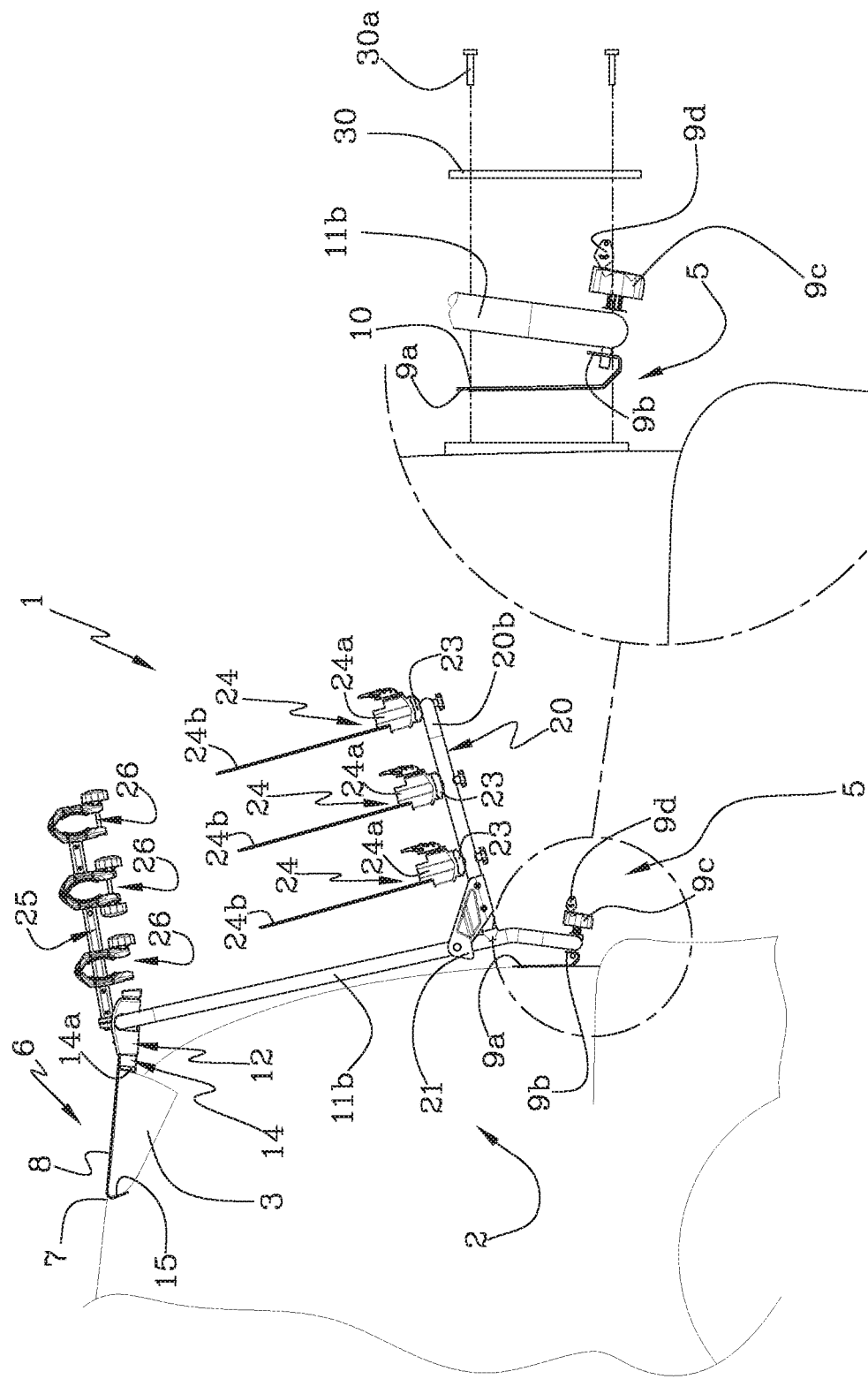
FIG. 2 is a side view of the rear cycle carrier of FIG. 1, showing a side view of the anchoring assembly and of the fixing device and wherein a part of this side view is enlarged.
Figure 3:
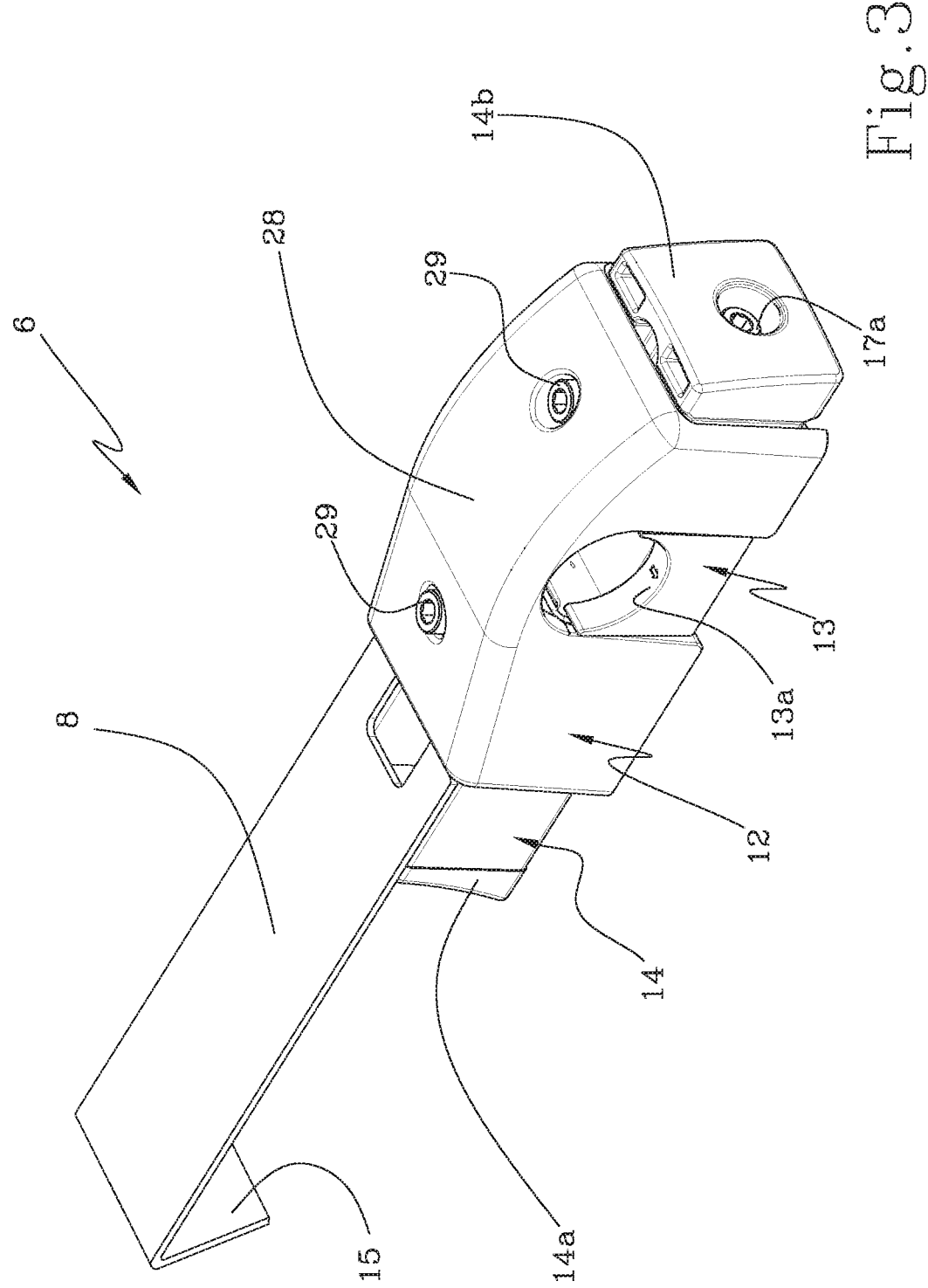
FIG. 3 is an axonometric view of the anchoring assembly.

The loading section 20 is fixed hinged to the support section 11 to rotate between a folded position (not illustrated), wherein the loading section 20 is close to the support section 11, and a loading position shown in FIGS. 1 and 2, in which the cycle carrier 1 is configured to receive and transport at least one bicycle. It should be noted that the loading frame 4 comprises two connecting elements 21, for example two shaped brackets. Each connection element 21 is fixed to one of the lateral support arms 11b and also fixed hinged to one of the lateral loading arms 20b at a zone below the lateral support arms 11b, to allow the rotation of the loading section 20 relative to the support section 11.

In a variant embodiment not illustrated, the loading section 20 is not U-shaped but comprises only the two lateral loading arms 20c, hinged to the lateral support arms 11b by means of the respective connecting elements 21.

What was said in connection with the support section 11 also applies with regard to the loading section 20, that is, the loading section 20 may also be made with a metallic tubular profile, for example made of aluminium. Advantageously, according to a different important aspect of this invention, it should be noted that the loading frame 4 has a very simple structure, made with the support section 11, U-shaped and made with a tubular profile, and with the loading section 20, also made with a tubular profile.

At least one hooking device 22 is fixable in a removable fashion on the loading section 20 for the removable hooking of the bicycle to the frame 4. The hooking device 22 includes at least one linear element 23, which can also be made from a metal profile, which is fixable in a removable fashion on the loading section 20, perpendicularly to the lateral loading arms 20b. The hooking device 22 also comprises a pair of wheel-holding brackets 24, fixable on the linear element 23.

Each bracket 24, equipped with an upper recess 24a and a wheel-holding strap 24b, is shaped in a suitable manner for receiving in the upper recess 24a a rear portion of a front wheel (not illustrated) of the bicycle or a front portion of a rear wheel (not illustrated), and for locking the front wheel or the rear wheel in the bracket 24 by means of the wheel-holding strap 24b.

FIGS. 1 and 2 show a loading frame 4 which comprises three hooking devices 22 installed on the loading section 20 for removably hooking three bicycles but it should be noted that a single hooking device 22 may be mounted on the loading section 20 for transporting a single bicycle.

In fact, each hooking device 22 can be easily removable/mountable by a user as required.

When the loading section 20 is in the loading position, a loading angle is defined of between 80° and 90° between the support section 11 and the loading section 20. Preferably, the angle of load is between 85° and 90° to place the loading section 20 substantially perpendicular to the support section 11.

The loading frame 4 also comprises at least one retaining section 25, which is linear and can be also made of tubular metal, which has a first end removably fixable to a retaining part of the support portion 11a, and a second end equipped with at least one retaining element 26 for removably retaining at least one part of the frame of the bicycle.

FIGS. 1 and 2 show a loading frame 4 which comprises a retaining section 25 equipped with a plurality of retaining elements 26.

According to a preferred variant of the cycle carrier according to the invention, the cycle carrier 1 comprises a further anchoring assembly 27 for fixing in a removable fashion the upper portion of the loading frame 4 to a further region of the upper edge 7 of the hatchback 2.

The further anchoring assembly 27 is equal to the anchoring assembly 6 and is not described for the sake of brevity, but the reader is referred to the description of the anchoring assembly 6 given above.

The further assembly 27 is configured to receive a further part of the support portion 11a in such a way as to anchor the loading frame 4 to the hatchback 2 in two different regions of the upper edge 7 and increase the stability of the association between the loading frame 4 and the hatchback 2. The presence of a pair of anchoring assemblies 6, 27 also makes it possible to support the loading frame 4 stably in two parts of the support portion 11a.

If both the anchoring assembly 6 and the further anchoring assembly 27 are present, the retaining section 25 is preferably fixed between the two anchoring assemblies 6 and 27 in such a way that the part and the further part of the support portion 11a, on which the anchoring assembly 6 and the further anchoring assembly 27 are respectively fixed in a removable fashion, are preferably positioned on opposite sides of the retaining part.

In use, a user superimposes the registration plate 30 on the plate 9a below the registration plate of the adapter 9 and by means of the fixing screws 30a simultaneously fixes the registration plate 30 and the plate 9a below the registration plate. The registration plate 30 is received between the protrusions 9b and the plate 9a below the registration plate.

The user fix the loading frame 4, already set up and assembled in all its parts, to the hatchback 2. As indicated below, it is advantageous that the user mounts the loading frame 4 on the hatchback 2 when the anchoring assembly 6, optionally the further anchoring assembly 27, the support section 11, the loading section 20, the retaining section 25 and the hooking device have all been assembled on each other.

Only a few assembly steps are in fact necessary for fixing the loading frame 4 to the hatchback 2.

A first assembly step comprises, initially, the user positioning the anchoring assembly 6. In order to do this, it is sufficient to position the second curved end 15 of the plate 8 hooked on the region of the upper edge 7 and rest the plate 8 on the spoiler 3.

A second installation step comprises, subsequently, the user securing the anchoring assembly 6 to the hatchback 2. To do this, it is sufficient to move the presser element of the first end 14a of the case 14 into contact against a surface of the spoiler 3 or of the hatchback 2, by acting on the head end 17a of the second movement element and thus advancing the case 14 to the advanced operating position.

If the further anchoring assembly 27 is present, the user must repeat the assembly steps described above for the anchoring assembly 6. After positioning the further anchoring assembly 27, the further anchoring assembly 27 is to be secured to the hatchback 2.

The last step of assembling the cycle carrier 1 comprises the user fixing the ends 11c the lateral support arms 11b to the protrusions 9b of the adapter 9 by means of the clamping knobs 9b.

The invention provides a cycle carrier 1 with a very simple structure which may be mounted on any vehicle with a hatchback 2 equipped with an upper spoiler 3 and in which the straps are absent. Both the anchoring assembly 6 and the fixing device 5 are, in effect, free of straps.

Thanks to the particular shape of the anchoring assembly 6, comprising a plate 8 and a support device 12, it is sufficient for a user to suitably position the plate 8 in such a way that it rests on the spoiler 3 and hooks to the region 7 of the upper edge, since the stability of the association between the loading frame 4 and the vehicle is guaranteed by the presence of the presser element 14a which comes into firm contact, after assembly is completed, with the hatchback 2 and/or the spoiler 3.

In addition, it should be noted that keeping unchanged the loading frame 4, the cycle carrier 1 can be advantageously mounted also on vehicles which are very different to each other merely by varying the anchoring assembly 6. As stated above, by varying a longitudinal dimension of the plate 8 and/or the shape and/or the angle of the first end 14a of the case 14, the anchoring assembly 6 may be configured for vehicles which are also very different to each other.

Thanks to a case 14 which is slidable inside a body 13 of the support device 12 which the user can slide by screwing a head end 17a of a screw 17, the assembly of the cycle carrier 1 is very simple and comprises only a positioning of the anchoring assembly 6, a clamping of the anchoring assembly 6 and, lastly, a fixing of the loading frame 4 to the fixing device 5, and that is to say, a tightening of the knobs 9c against the adapter 9.

It should be noted that the user can leave the adapter 9 always mounted on the vehicle, even in the absence of the loading frame 4. Thanks to this, the assembly steps may be further simplified.

The invention claimed is:

1. A cycle carrier (1) designed to be mounted on a rear part (2) of a vehicle provided with an upper spoiler (3), comprising:
    a loading frame (4) for removably loading at least one bicycle,
    a fixing device (5) for removably fixing a lower portion of the loading frame (4) to a lower region of the rear part (2);
    at least one anchoring assembly (6) for removably fixing an upper portion of the loading frame (4) to a region of an upper edge (7) of the rear part (2); wherein
    the anchoring assembly (6) comprises a plate (8) which is elongated, which extends along a respective longitudinal axis of extension (A) and is arranged, when the cycle carrier is installed, to rest on the spoiler (3) and to be engaged in the region of the upper edge (7); and wherein
    the fixing device (5) comprises an adapter (9) which is rigid and fixable to the vehicle using holes already existing in the lower region of the rear part (2); wherein
    the loading frame (4) comprises a support section (11), which is shaped and includes a support portion (11a);
    the anchoring assembly comprising a support device (12), fixed to a first end of the plate (8), which is configured to receive a part of the support portion (11a); wherein
    the support device (12) comprises an elongated body (13), which extends along the axis (A) and is made of a single body with the plate (8); a case (14), which is internal to the body (13) and is slidable in an advancement direction (D) parallel to the longitudinal axis (A') between an advanced operating position and a retracted position; the case (14) being equipped with a first end (14a) provided with a presser element made of shock resistant material designed to abut the vehicle, once the cycle carrier (1) is installed, when the case (14) is at least in the advanced operating position.

2. The cycle carrier according to claim 1, wherein the support section (11) is U-shaped and the support portion (11a) is equipped with ends that extend in two lateral support arms (11b) which, once the cycle carrier (1) is installed, face downwards; the lateral support arms (11b) having respective ends (11c) which are removably fixed to the adapter (9), for removably fixing the fixing device (5) to the loading frame (4).

3. The cycle carrier according to claim 2, wherein the rigid adaptor (9) includes a plate (9a) below a registration plate, which is elongated to be positioned below a registration plate (30) of the vehicle and can be fixed to the vehicle by using the holes provided for the registration plate (30), and wherein the plate (9a) below the registration plate is provided beneath with two portions bent upwards so as to define two lateral projections (9b), each lateral projection (9b) being removably fixable to a respective end (11c) of a lateral support arm (11b) through an anti-theft knob (9c) equipped with a key (9d).

4. The cycle carrier according to claim 1, wherein the support device (12) comprises a respective first movement element (16) fixed to the body (13) and a respective second movement element (17) which is elongated, housed in the case (14) and is provided with a head end (17a), the first movement element (16) and the second movement element (17) being coupled to one another through threaded coupling so that, by activating the second movement element (17) in rotation through the head end (17a), the case (14) is moved in the advancement direction (D) between the advanced operating position and the retracted position.

5. The cycle carrier according to claim 4, wherein the head end (17a) of the second movement element (17) is housed in a second end (14b) of the case (14) to be activated by a user.

6. The cycle carrier according to claim 1, wherein the plate (8) comprises a second end (15), which is curved and designed to be hooked to the region of the upper edge (7).

7. The cycle carrier according to claim 1, wherein the dimension along the longitudinal axis of extension (A) of the plate (8) is greater than the dimension of the spoiler (3) along the axis (A) so that the plate (8) rests on the entire spoiler (3) and projects therefrom.

8. The cycle carrier according to claim 1, wherein the rigid adaptor (9) includes a plate (9a) below a registration plate, which is elongated to be positioned below a registration plate (30) of the vehicle and can be fixed to the vehicle by using the holes provided for the registration plate (30).

9. The cycle carrier according to claim 1, wherein the loading frame (4) further comprises a loading section (20) also U-shaped comprising a respective loading portion (20a), whose ends extend in two respective lateral loading arms (20b); the loading section (20) being hinged to the support section (11) for rotating between a bent position, in which the loading section (20) is closer to the support section (11), and a loading position; on the loading section (20) there being at least one removably fixable loading device (22) equipped with wheel-holding brackets (24) for the removable hooking of the bicycle to the loading frame (4).

10. The cycle carrier according to claim 1, wherein the loading frame (4) further comprises at least one retaining section (25), which has a first end (25a) removably fixable to a retaining part of the support portion (11a), and a second end provided with a retaining device (26) for removably retaining at least one part of the frame of the bicycle.

11. The cycle carrier according to claim 10, and comprising a further anchoring assembly (27) for removably fixing the upper portion of the loading frame (4) to a further region of the upper edge (7) of the rear part (2); wherein the further anchoring assembly (27) is the same as the anchoring assembly (12) and is configured to receive a further part of the support portion (11a), and wherein the part and the further part of the support portion (11a), on which respectively the anchoring assembly (12) and the further anchoring assembly (27) are fixed in a removable way, are arranged on opposite sides with respect to the retaining part.

12. The cycle carrier according to claim 1, and comprising a further anchoring assembly (27) for removably fixing the upper portion of the loading frame (4) to a further region of the upper edge (7) of the rear part (2); wherein the further anchoring assembly (27) is the same as the anchoring assembly (12) and is configured to receive a further part of the support portion (11a).

* * * * *